United States Patent
Kubota (10) Patent No.: US 8,382,291 B2
(45) Date of Patent: Feb. 26, 2013

(54) PROJECTOR AND METHOD OF CONTROLLING PROJECTOR CANCELLING KEYSTONE DISTORTION CORRECTION AND MODULATING GUIDE PATTERN IN RESPONSE TO START MOVEMENT OF THE PROJECTOR

(75) Inventor: Shinji Kubota, Ima (JP)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 12/605,745

(22) Filed: Oct. 26, 2009

(65) Prior Publication Data

US 2010/0103385 A1    Apr. 29, 2010

(30) Foreign Application Priority Data

Oct. 29, 2008   (JP) ................. 2008-278551

(51) Int. Cl.
*G03B 21/14*   (2006.01)
*G03B 3/00*    (2006.01)
(52) U.S. Cl. ........................ 353/70; 353/121
(58) Field of Classification Search .......... 353/70, 353/69, 119, 121, 122; 348/745, 746, 744, 348/806, 750, 759; 345/647; 250/208.1
See application file for complete search history.

(56) References Cited

U.S. PATENT DOCUMENTS

| | | | |
|---|---|---|---|
| 6,686,973 B2 | 2/2004 | Su | |
| 6,843,569 B2 | 1/2005 | Hirao et al. | |
| 6,877,863 B2 | 4/2005 | Wood et al. | |
| 6,877,864 B1 | 4/2005 | Tamura et al. | |
| 6,974,217 B2 | 12/2005 | Kimura et al. | |
| 7,070,283 B2 | 7/2006 | Akutsu | |
| 7,144,115 B2 | 12/2006 | Li | |
| 7,150,536 B2 | 12/2006 | Inoue | |
| 7,175,285 B2 | 2/2007 | Li et al. | |
| 7,201,482 B2 | 4/2007 | Tamura | |
| 7,303,285 B2 | 12/2007 | Inoue | |
| 7,344,253 B2 | 3/2008 | Tamura | |
| 7,484,854 B2 | 2/2009 | Miyasaka | |
| 7,690,797 B2 | 4/2010 | Higashi | |

(Continued)

FOREIGN PATENT DOCUMENTS

| | | |
|---|---|---|
| JP | A-2002-268142 | 9/2002 |
| JP | A-2003-32579 | 1/2003 |

(Continued)

OTHER PUBLICATIONS

Office Action issued in U.S. Appl. No. 12/605,916; mailed Mar. 30, 2012.

*Primary Examiner* — Que T Le
*Assistant Examiner* — Jennifer Bennett
(74) *Attorney, Agent, or Firm* — Oliff & Berridge, PLC (57) ABSTRACT

A projector adapted to perform display by projecting an image on a projection surface, includes: a light source; a light modulator adapted to modulate light from the light source into image light representing the image; a projection optical system adapted to project the image light modulated by the light modulator on the projection surface; a keystone distortion correction section adapted to perform a keystone distortion correction process for correcting keystone distortion of the image to be projected on the projection surface; a detection section adapted to detect start of movement of the projector; and a control section adapted to cancel the keystone distortion correction process in the keystone distortion correction section in response to detection of start of movement of the projector in the detection section.

6 Claims, 9 Drawing Sheets

U.S. PATENT DOCUMENTS

| | | |
|---|---|---|
| 7,905,607 B2 | 3/2011 | Takatsu et al. |
| 8,009,929 B2 | 8/2011 | Sakurai |
| 2002/0122161 A1 | 9/2002 | Nishida et al. |
| 2003/0223048 A1 | 12/2003 | Kimura |
| 2004/0036844 A1 | 2/2004 | Wood et al. |
| 2004/0041985 A1 | 3/2004 | Kimura et al. |
| 2005/0162624 A1* | 7/2005 | Miyasaka ............... 353/101 |
| 2005/0231820 A1 | 10/2005 | Miyasaka |
| 2006/0103811 A1 | 5/2006 | May et al. |
| 2006/0197921 A1 | 9/2006 | Kurosu et al. |
| 2006/0204125 A1 | 9/2006 | Kempf et al. |
| 2006/0256298 A1 | 11/2006 | Knipe |
| 2006/0285080 A1* | 12/2006 | Kurihara ................ 353/70 |
| 2006/0285089 A1* | 12/2006 | Higashi ................ 353/101 |
| 2007/0097328 A1 | 5/2007 | Li et al. |
| 2007/0249396 A1* | 10/2007 | Nitta et al. ............ 455/556.1 |
| 2008/0079907 A1 | 4/2008 | Takatsu et al. |
| 2010/0046088 A1 | 2/2010 | Kubota |
| 2010/0103385 A1 | 4/2010 | Kubota |
| 2010/0103386 A1 | 4/2010 | Kubota |
| 2010/0165302 A1 | 7/2010 | Ozawa |
| 2010/0177283 A1 | 7/2010 | Tanaka |
| 2010/0265469 A1 | 10/2010 | Matsumoto et al. |
| 2010/0302466 A1 | 12/2010 | Kubota |
| 2011/0288964 A1 | 11/2011 | Linder et al. |

FOREIGN PATENT DOCUMENTS

| | | |
|---|---|---|
| JP | 2003131118 A * | 5/2003 |
| JP | A-2003-204495 | 7/2003 |
| JP | A-2003-348498 | 12/2003 |
| JP | A-2005-72953 | 3/2005 |
| JP | A-2005-148381 | 6/2005 |
| JP | A-2005-257766 | 9/2005 |
| JP | A-2006-54824 | 2/2006 |
| JP | A-2006-304100 | 11/2006 |
| JP | A-2007-228154 | 9/2007 |

* cited by examiner

| LIQUID CRYSTAL PANEL | DISPLAYED IMAGE |
|---|---|
| FIG. 8A1 KEYSTONE CORRECTION 1  | FIG. 8B1  |
| ↓ CANCEL KEYSTONE CORRECTION DISPLAY GUIDE PATTERN | ↓ START MOVEMENT OF PROJECTOR |
| FIG. 8A2  | FIG. 8B2  |
| ↓ | ↓ SCREEN POSITION CHANGE /PROJECTOR POSITION CHANGE |
| FIG. 8A3  | FIG. 8B3  |
| ↓ KEYSTONE CORRECTION 2 | |
| FIG. 8A4  | FIG. 8B4  |

LIQUID CRYSTAL PANEL | DISPLAYED IMAGE

↓ KEYSTONE CORRECTION 1

↓ WITHOUT CHANGE | ↓ SCREEN POSITION CHANGE /PROJECTOR POSITION CHANGE

↓ KEYSTONE CORRECTION 2

PROJECTOR AND METHOD OF CONTROLLING PROJECTOR CANCELLING KEYSTONE DISTORTION CORRECTION AND MODULATING GUIDE PATTERN IN RESPONSE TO START MOVEMENT OF THE PROJECTOR

The entire disclosure of Japanese Patent No. 2008-278551 filed Oct. 29, 2008 is expressly incorporated by reference herein.

BACKGROUND

1. Technical Field

The present invention relates to a projector for displaying images on a projection surface.

2. Related Art

When displaying an image with a rectangular image area on a projection surface such as a screen using a projector, the image area of the image (hereinafter also referred to as a "projected image") displayed on the projection surface might be distorted into a trapezoidal shape depending on a relative positional relationship between the projector and the projection surface. On such an occasion, there is used a keystone correction for correcting the distortion (hereinafter also referred to as "keystone distortion") of the projected image (see, e.g., JP-A-2006-54824).

Figure 9A:
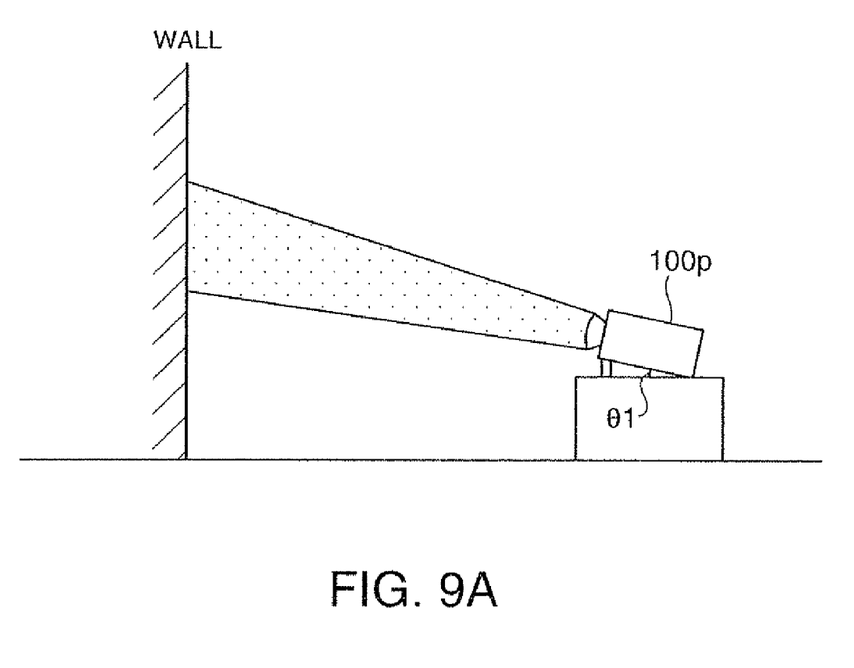
FIGS. 9A and 9B are explanatory diagrams showing how the user moves the projector thereby changing the position where the image is displayed.
Figure 9B:
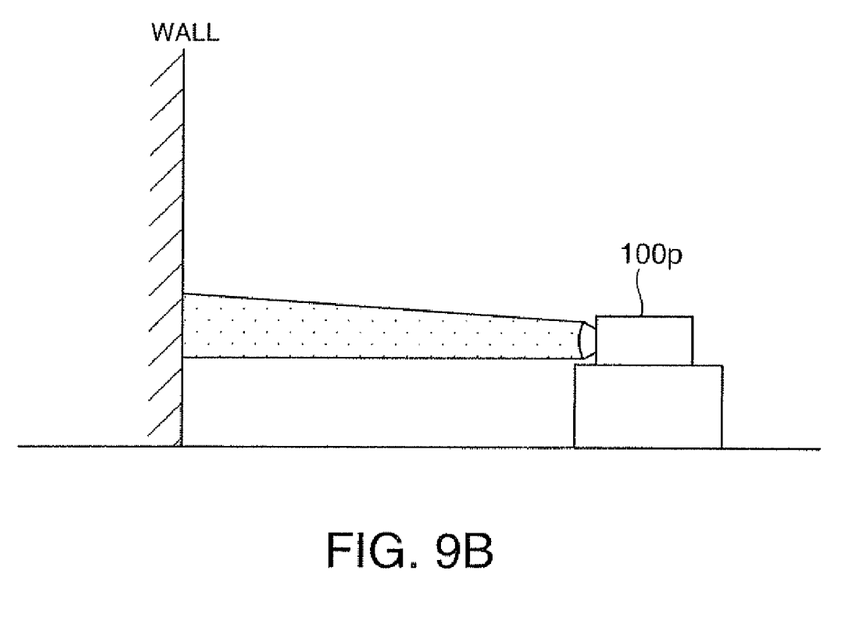

For example, in the case in which the image (hereinafter also referred to as a "corrected image") on which the keystone correction process is executed is displayed on the projection surface, the user might move the projector to change the position where the image is displayed. FIGS. 9A and 9B are explanatory diagrams showing how the user moves the projector thereby changing the position where the image is displayed. FIG. 9A shows the state in which the projector 100$p$ of the related art is installed so as to be tilted an angle θ1 upward from the horizontal. FIG. 9B shows the state in which the projector 100$p$ is installed horizontally. As shown in FIGS. 9A and 9B, the image is projected on a wall surface. The user at first displays the image on the wall surface at the position shown in FIG. 9A, and then changes the tilt of the projector 100$p$ so as to display the image on the lower side of the position shown in FIG. 9A. It should be noted that here the position of the image displayed on the wall surface is assumed not to move in a lateral direction.

Figure 10A:
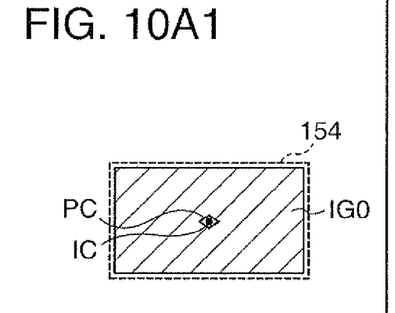

FIGS. 10A1 through 10A4, and 10B1 through 10B4 are explanatory diagrams conceptually showing the displayed image in the case in which the position of the projector is moved as shown in FIGS. 9A and 9B. FIGS. 10A1 through 10A4 show a liquid crystal panel 154 provided to the projector 100$p$. In the entire area of the liquid crystal panel, an image light generation area IG, which generates the image light representing the image, is indicated by hatching with oblique lines. It should be noted that the image light generation area on which the keystone correction process is not executed is denoted as IG0, the image light generation area on which the keystone correction process at the projector position shown in FIG. 9A (also referred to as a keystone correction 1) is executed is denoted as IG1, and the image light generation area on which the keystone correction process at the projector position shown in FIG. 9B (also referred to as a keystone correction 2) is executed is denoted as IG2.

FIGS. 10B1 through 10B4 show an image display area PIG as an area of the wall surface where the image is displayed. FIGS. 10B1 through 10B4 show the displayed image viewed from the user located right in front of the wall (FIGS. 9A and 9B). A panel display area PA, which is the entire area of the liquid crystal panel 154, is illustrated with broken lines. The image display area PIG where the image represented by the image light modulated by the liquid crystal panel 154 is indicated by hatching with oblique lines. It should be noted that the image display area before executing the keystone correction 1 is denoted as PIG0, the image display area after executing the keystone correction 1 at the projector position shown in FIG. 9A is denoted as PIG1, the image display area before executing the keystone correction 2 at the projector position shown in FIG. 9B is denoted as PIG2, the image display area after executing the keystone correction 2 is denoted as PIG3.

Figure 10A:
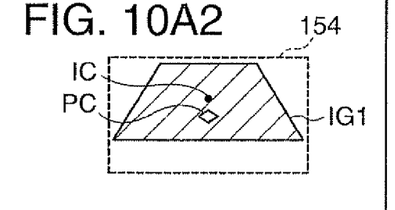
Figure 10A:
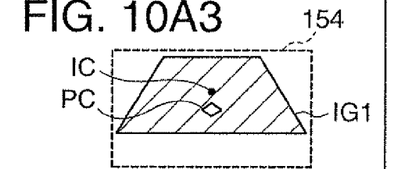
Figure 10A:
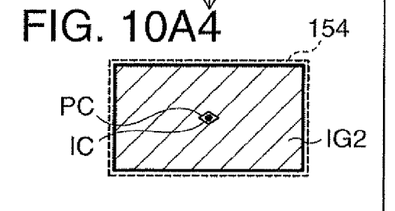
Figure 10B:
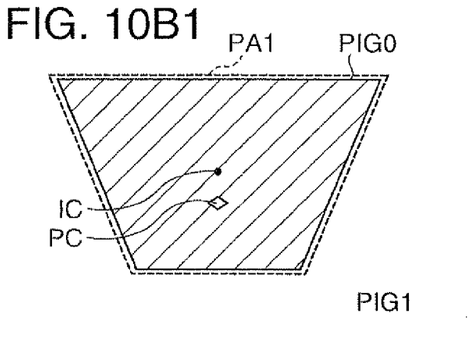
Figure 10B:
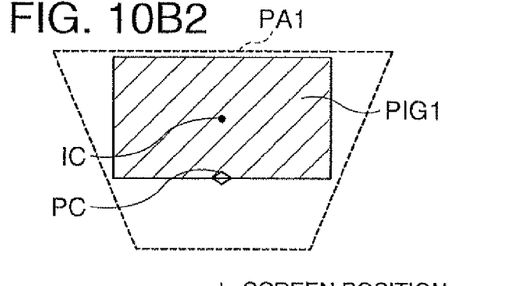

In the case in which the projector 100$p$ is installed so as to be tilted the angle θ1 upward from the horizontal as shown in FIG. 9A, the image light generation area IG0 is identical to the entire area of the liquid crystal panel 154 in the state in which the keystone correction process is not executed (FIG. 10A1). On this occasion, the image display area PIG0 is distorted to have a trapezoidal shape (FIG. 10B1).

In FIGS. 10A1 through 10B4, the center PC of the liquid crystal panel 154 and the panel display area PA is denoted as a rhombic symbol, and the center IC of the image light generation area IG and the image display area PIG is denoted as a black circular symbol. In the present embodiment, an intersection between the line bisecting the height of the image light generation area IG and the line bisecting the width thereof is defined as the center IC of the image light generation area IG. The same is applied to the center IC of the image display area PIG. The reason therefor is that when viewing the projected image, the user often recognizes the vicinity of the intersection between the line bisecting the height of the projected image and the line bisecting the width thereof as the center of the projected image. Incidentally, the center PC of the panel display area PA is defined as the center of the figure of the panel display area PA. For example, in the case in which the panel display area PA forms a trapezoidal shape, the intersection of the diagonal lines thereof corresponds to the center PC of the panel display area PA.

As shown in FIG. 10A2, when the keystone correction process is executed, the image light generation area IG1 (FIG. 10A2) is formed by distorting the image light generation area IG0 (FIG. 10A1) of the liquid crystal panel 154 in the counter direction with respect to the image displayed on the projection surface. When executing the keystone correction 1 in such a manner, the position is often shifted between the center PC (rhombic symbol) of the liquid crystal panel 154 and the center IC (black circular symbol) of the image light generation area IG1 (FIG. 10A2).

Subsequently, in order for displaying the image on the lower side (FIG. 9B) of the display position of the image shown in FIG. 9A, the user moves the projector 100$p$, and installs the projector 100$p$ horizontally. On this occasion, since a keystone correction amount (parameter) of the keystone correction process is not changed, as shown in FIG. 10A3, the shape of the image light generation area IG1 remains as shown in FIG. 10A2. At the position shown in FIG. 9B, the projector 100$p$ is installed horizontally, and is opposed right to the wall surface.

Therefore, the panel display area PA2 becomes to have a rectangular shape, which is the same as the shape of the liquid crystal panel 154 (FIG. 10B3). When executing the keystone correction process (described as the keystone correction 2 in FIG. 10A3) again in the state in which the projector 100$p$ is installed horizontally (FIG. 9B), the image display area PIG2 becomes identical to the entire area of the liquid crystal panel 154 (FIG. 10A4). Therefore, the image with the rectangular image display area PIG2 is displayed on the wall surface (FIG. 10B4).

Figure 10B:
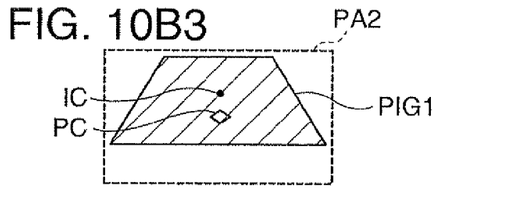
Figure 10B:
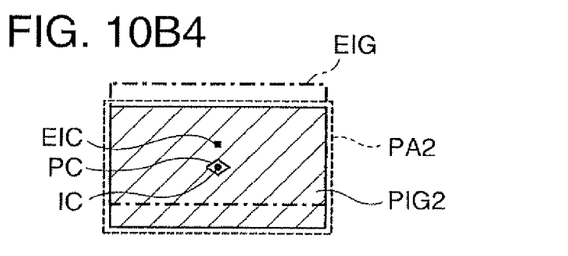

The user supposes that when the keystone correction 2 is executed after installing the projector 100p horizontally, the image display area FIG corrected to have a rectangular shape centered on the center IC of the image display area PIG1 shown in FIG. 10B3 is displayed. The image display area FIG supposed by the user is illustrated with dashed lines in FIG. 10B4. The center SIC of the image display area EIG is indicated by a black rectangular symbol. The position of the center SIC (FIG. 10B4) of the image display area EIG is identical to the center IC (FIG. 10B3) of the image display area PIG1.

However, the center IC of the image display area PIG after executing the keystone correction 2 becomes identical to the center PC of the panel display area PA2, but not identical to the center EIC of the image display area EIG (FIG. 10B4). In other words, the image display area PIG2 is formed at a position different from the position supposed by the user (FIG. 10B4).

SUMMARY

Therefore, in view of the problem in the related art described above, the invention has an advantage of providing a technology for reducing the shift between the display position of the image supposed by the user and the actual display position of the image in the case in which the display position of the image displayed on the projection surface by the projector is changed and the keystone distortion correction is executed thereon.

The invention has an advantage of solving at least a part of the problem described above, and can be realized as following aspects.

According to an aspect of the invention there is provided a projector adapted to perform display by projecting an image on a projection surface, including a light source, a light modulator adapted to modulate light from the light source into modulate image light representing the image, a projection optical system adapted to project the image light modulated by the light modulator on the projection surface, a keystone distortion correction section adapted to perform a keystone distortion correction process for correcting keystone distortion of the image to be projected on the projection surface, a detection section adapted to detect start of movement of the projector, and a control section adapted to cancel the keystone distortion correction process in the keystone distortion correction section in response to detection of the start of movement of the projector in the detection section.

In the present specification, the movement of the projector includes not only moving the position of the projector to a different location, but also changing the projection angle of the projector with respect to the projection surface.

According to the projector of this aspect of the invention, when the start of the movement of the projector is detected, the keystone distortion correction process is canceled. If the keystone distortion correction process is canceled, the image display area, which is the entire area of the image displayed on the projection surface, becomes identical to the entire display area of the liquid crystal panel. Setting the position of the projector so that the center of the image display area in the state in which the keystone distortion correction process is canceled matches the center of the area in which the user desires to display the image leads to matching the projection axis of the projector with the center of the area in which the user desires to display the image. Therefore, when the keystone distortion correction process is performed after the movement of the projector, it is possible to reduce the shift between the display position of the image after executing the keystone distortion correction process and the display position of the image supposed by the user.

According to the projector, since the center of the maximum area capable of modulating the light in the light modulator can be recognized using the guide pattern, it is possible for the user to set the position of the projector using the guide pattern as a reference. As a result, convenience to the user is enhanced.

According to the projector of this aspect of the invention, the start of the movement of the projector can easily be detected using the angular velocity sensor.

According to the projector of this aspect of the invention, when the stop of the movement of the projector is detected, the keystone distortion correction process in the destination of the projector is restarted. For example, in the case in which the user moves the projector, since the keystone distortion correction process is automatically executed at the destination, without any operation by the user for executing the keystone distortion correction, convenience to the user is enhanced.

According to the projector of this aspect of the invention, the stop of the movement of the projector can easily be detected using the angular velocity sensor.

BRIEF DESCRIPTION OF THE DRAWINGS

The invention will now be described with reference to the accompanying drawings, wherein like numbers reference like elements.

FIGS. 8A1 through 8A4, and 8B1 through 8B4 are explanatory diagrams conceptually showing the display image in the case in which the position of the projector 100 is moved.

FIGS. 10A1 through 10A4, and 10B1 through 10B4 are explanatory diagrams conceptually showing the display image in the case in which the position of the projector is moved.

DESCRIPTION OF EXEMPLARY EMBODIMENTS

Embodiments of the invention will hereinafter be explained based on the embodiments in the following order.
A. Embodiments
B. Modified Examples

A. EMBODIMENT

A-1. Configuration of Embodiment

Figure 1:
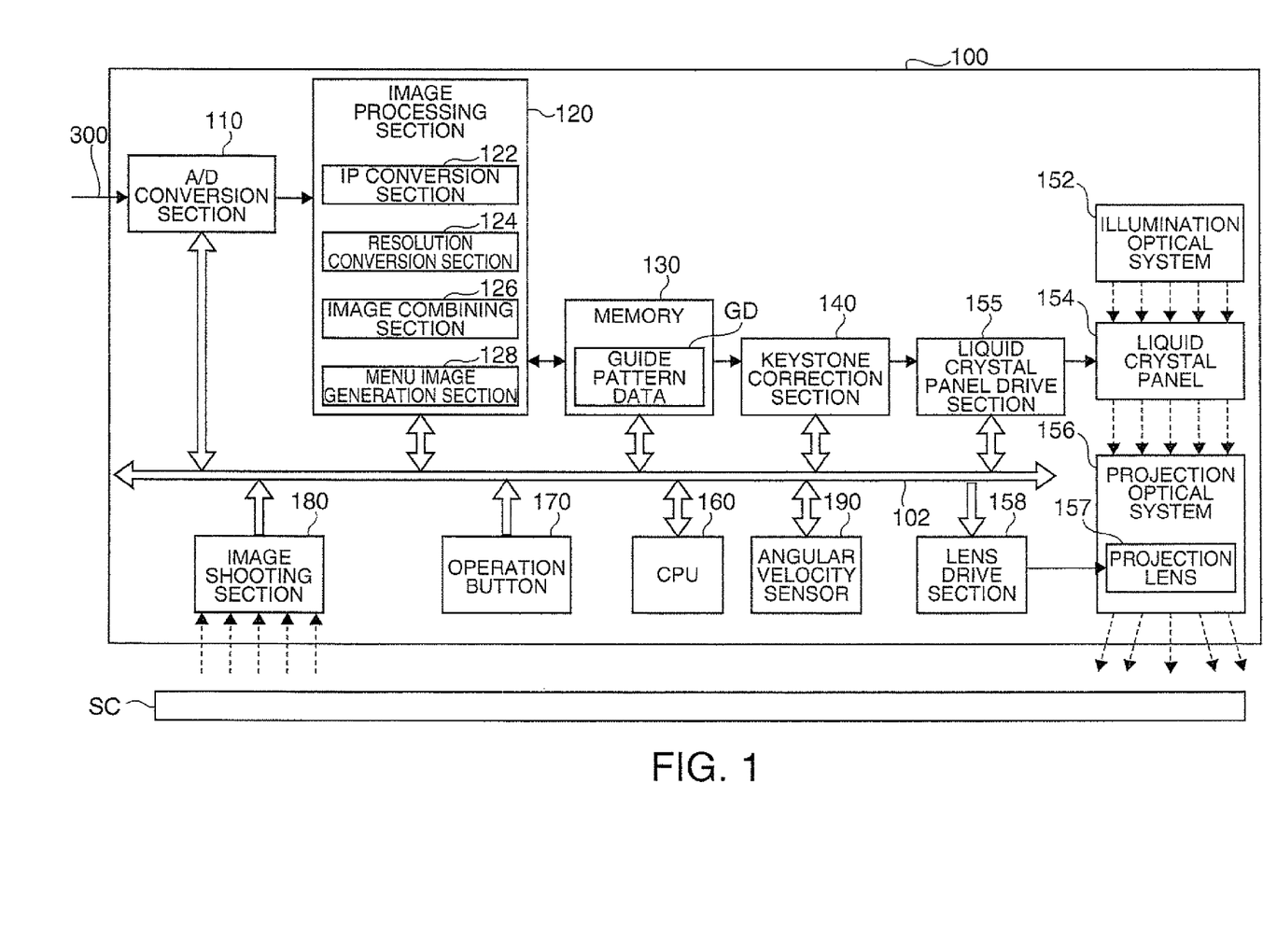
FIG. 1 is a block diagram schematically showing a configuration of a projector as an embodiment of the invention.

FIG. 1 is a block diagram schematically showing a configuration of a projector as an embodiment of the invention. As shown in the drawing, the projector 100 is provided with an A/D conversion section 110, an image processing section 120, a memory 130, a keystone correction section 140, a liquid crystal panel 154, a liquid crystal panel drive section 155, an illumination optical system 152, a projection optical system 156 including a projection lens 157, a lens drive section 158, a CPU 160, an operation button 170, an image shooting section 180, and an angular velocity sensor 190.

The A/D conversion section 110 executes A/D conversion on an input image signal input from a DVD player or a personal computer not shown via a cable 300 according to needs, and then outputs a digital image signal.

The image processing section 120 writes the digital image signal output from the A/D conversion section 110 into the memory 130 frame by frame. The image processing section 120 includes functions as an IP conversion section 122, a resolution conversion section 124, an image combining section 126, and a menu image generation section 128.

The IP conversion section 122 executes a process for converting the format of the image data stored in the memory 130 from the interlace format to the progressive format, and supplies the resolution conversion section 124 with the image data thus obtained.

The resolution conversion section 124 executes a size expanding process or a size shrinking process (i.e., the resolution conversion process) on the image data supplied from the IP conversion section 122, and then supplies the image combining section 126 with the image data thus obtained.

The menu image generation section 128 generates characters and symbols representing the operation state of the projector 100 or an image used when performing the image quality adjustment and so on and then supplies them to the image combining section 126.

The image combining section 126 synthesizes the menu image data representing the menu image thus generated by the menu image generation section 128 and the image data supplied from the resolution conversion section 124 with each other, and then writes them into the memory 130 as uncorrected image data.

The keystone correction section 140 corrects the distortion (hereinafter referred to as keystone distortion) caused when performing projection in the condition in which the projection axis of the projector 100 is tilted with respect to the screen. Specifically, the keystone correction section 140 executes the correction process on the uncorrected image data stored in the memory 130 so as to compensate the keystone distortion, and then supplies the result to the liquid crystal panel drive section 155 as corrected image data. The process in the keystone correction section 140 will be described later in detail.

In the present embodiment, the keystone correction section 140 is capable of calculating the tilt of the projector 100 with respect to the screen SC based on the shot image by the image shooting section 180, and then setting the keystone correction amount executed on the image so that the distortion of the image is reduced based on the calculation result. In other words, in the present embodiment, since the keystone correction amount is calculated and then set automatically, the process for calculating and then setting the keystone correction amount is also called an "automatic keystone correction" distinctly from the case in which the user sets the keystone correction amount via the operation button 170, or the case in which the keystone correction amount has previously been set. The keystone correction section 140 in the present embodiment corresponds to a keystone distortion correction section in the appended claims.

The liquid crystal panel drive section 155 drives the liquid crystal panel 154 based on the corrected image data input via the keystone correction section 140. The liquid crystal panel 154 is formed of a transmissive liquid crystal panel having a plurality of pixels arranged in a matrix. The liquid crystal panel 154 is driven by the liquid crystal panel drive section 155 to vary the light transmission in each of the pixels disposed in a matrix, thereby modulating the illumination light emitted from the illumination optical system 152 into effective image light representing an image. The liquid crystal panel drive section 155 and the liquid crystal panel 154 in the present embodiment correspond to a light modulator in the appended claims.

The light source 152 is configured including a lamp such as a high-pressure mercury lamp or a super high-pressure mercury lamp, or a light emitter other than the lamp. The illuminating optical system 152 in the present embodiment corresponds to a light source in the appended claims.

The projection optical system 156 is attached to a front surface of a housing of the projector 100, and enlargedly projects the image light obtained by the modulating operation of the liquid crystal panel 154. The projection lens 157 is provided with a plurality of lenses including a zoom lens and a focus lens. The zoom lens and the focus lens move back and forth along the optical axis of the projection optical system 156.

The lens drive section 158 is capable of driving the projection lens 157 included in the projection optical system 156 to adjust the focus or change the zoom state. When changing the zoom state, in the projection optical system 156, degree of expansion (magnifying power) in projecting the light transmitted through the liquid crystal panel 154 is changed. In other words, the lens drive section 158 can change the size of the image displayed on the screen SC by driving the projection lens 157. The projection optical system 156 in the present embodiment corresponds to a projection optical system in the appended claims.

The operation button 170 is operated by the user, and transmits an instruction of the user to the CPU 160 via a bus 102. It should be noted that although in the present embodiment the projector 100 is assumed to receive the instruction of the user via the operation button 170, it is also possible to receive the instruction of the user via other configurations such as a remote controller.

The image shooting section 180 has a CCD camera, and generates a shot image. The shot image generated by the image shooting section 180 is stored in a shot image memory not shown. It should be noted that the image shooting section 180 can also be arranged to have other shooting devices instead of the CCD camera.

Figure 2:
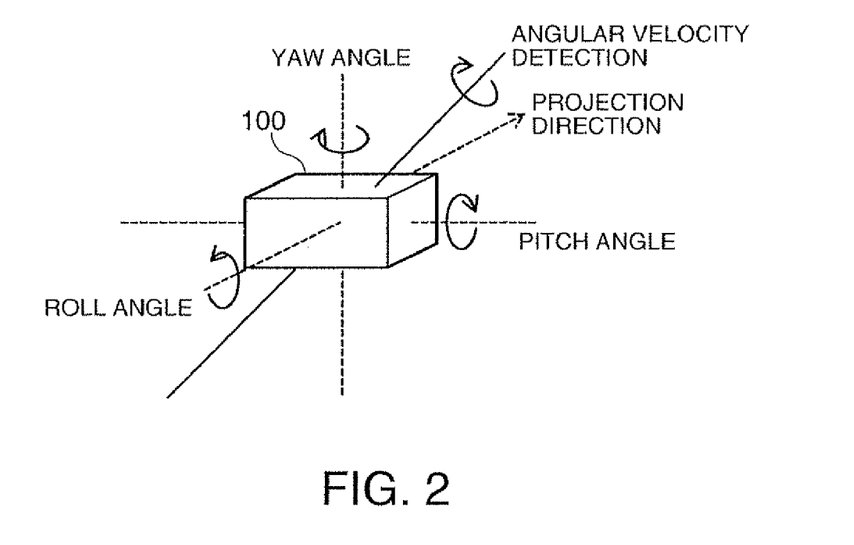
FIG. 2 is a diagram showing an angular velocity detection axis of the projector 100.

The angular velocity sensor 190 detects the angular velocity around an angular velocity detection axis passing through the center of the projector 100. FIG. 2 is a diagram showing the angular velocity detection axis of the projector 100. As shown in FIG. 2, a rotational angle around the projection axis is referred to as a roll angle, a projection angle in a vertical direction is referred to as a pitch angle, and a projection angle in a lateral direction is referred to as a yaw angle. The angular velocity detection axis is disposed so as to pass by the intersection (i.e., the center of the projector 100) between the projection axis, a vertical axis, and a lateral axis, and equally divide the projection axis, the vertical axis, and the lateral axis. By detecting the angular velocity around the angular velocity detection axis using the angular velocity sensor 190, it is possible to detect starting and stopping of the movement around the projection axis, the movement in the vertical direction, and the movement in the lateral direction of the projector 100.

The CPU 160 reads out and executes a control program stored in the memory 130, thereby controlling the operation of each section in the projector 100. Further, based on the angular velocity detected by the angular velocity sensor 190, the CPU 160 makes the keystone correction section 140 cancel the keystone correction process and start the automatic keystone correction process. Further, concurrently with the cancel of the keystone correction process, the CPU 160 makes the keystone correction section 140 output guide pattern data previously stored in the memory 130 instead of the uncorrected image data (not shown) stored in the memory 130. As a result, the guide pattern is displayed on the screen SC.

Figure 3:
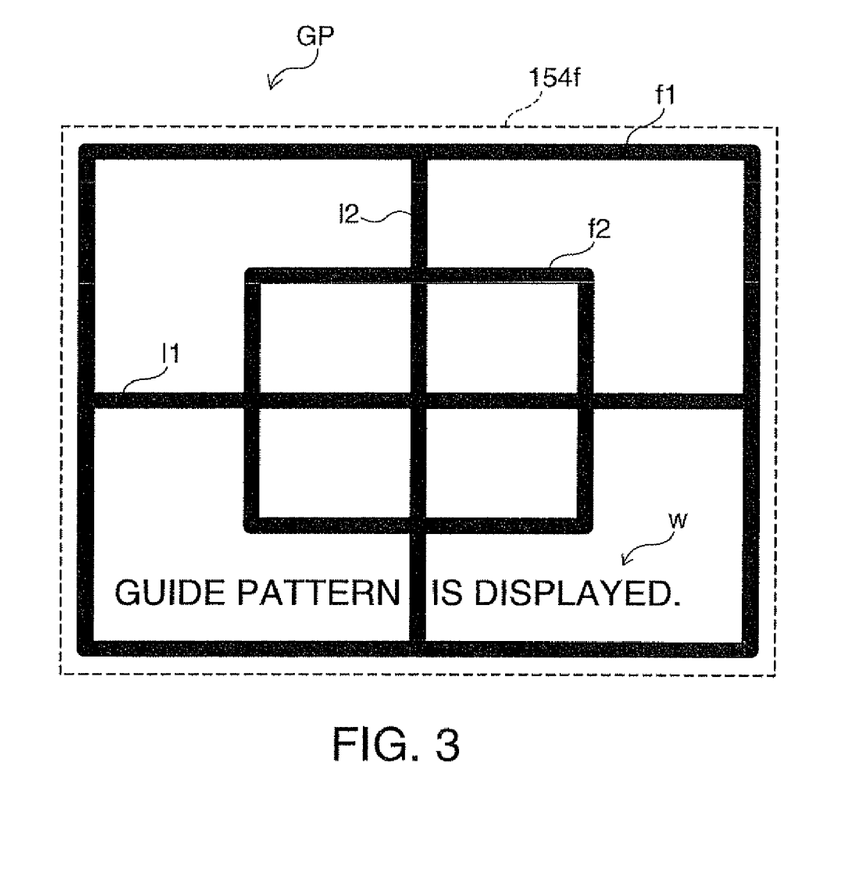
FIG. 3 is an explanatory diagram showing a guide pattern GP.

FIG. 3 is an explanatory diagram showing the guide pattern GP represented by the guide pattern data GD previously stored in the memory 130. In FIG. 3, the outline 154f of the entire area of the liquid crystal panel 154 is illustrated with a broken line. As shown in FIG. 3, the guide pattern GP is provided with a first frame line f1, a second frame line f2, a horizontal bisector l1, a vertical bisector l2, and a character string w saying "GUIDE PATTERN IS DISPLAYED."

As shown in the drawing, the first frame line f1 is identical to the outline 154f of the entire area of the liquid crystal panel 154. It should be noted that in FIG. 3, in order for clearly showing the guide pattern GP, the outline 154f of the entire area of the liquid crystal panel 154 and the outline of the guide pattern are displayed so as to be slightly shifted from each other. The horizontal bisector l1 is a straight line bisecting the area of the rectangle formed of the first frame line f1 in the horizontal direction. The vertical bisector l2 is a straight line bisecting the area of the rectangle formed of the first frame line f1 in the vertical direction. In other words, the intersection between the horizontal bisector l1 and the vertical bisector l2 represents the center of the entire area of the liquid crystal panel 154. The second frame line f2 is obtained by shrinking the first frame line f1 centering around the center point (i.e., the intersection between the horizontal bisector l1 and the vertical bisector l2) thereof so that the area of the frame line f2 becomes 25% of the area of the frame line f1. It should be noted that the guide pattern GP is not limited to the present embodiment, but any pattern indicating at least the center of the entire area of the liquid crystal panel 154 can be adopted.

A-2. Operation of Projector

Figure 4:
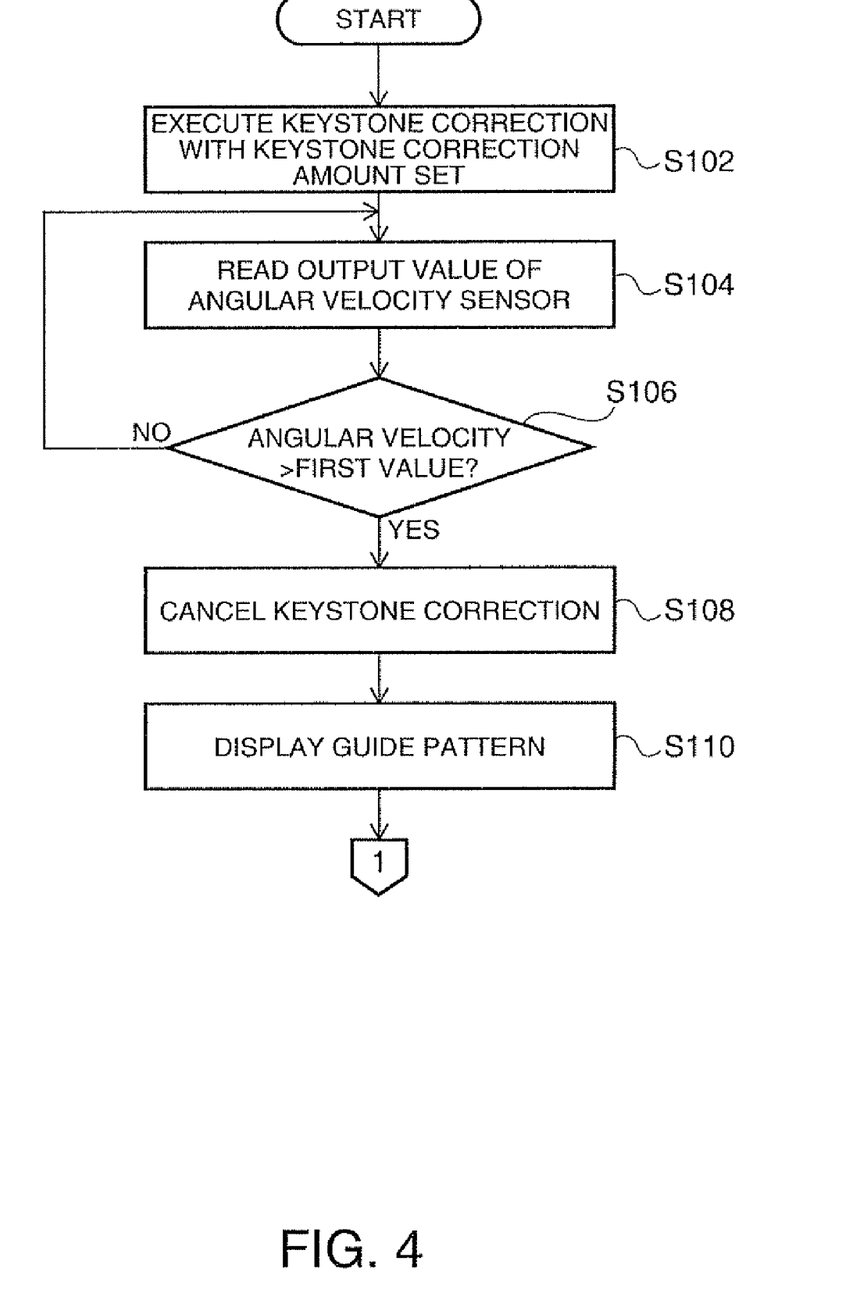
FIG. 4 is a flowchart showing a flow of a cancel process of the keystone correction and a starting process of the keystone correction in the projector 100.
Figure 5:
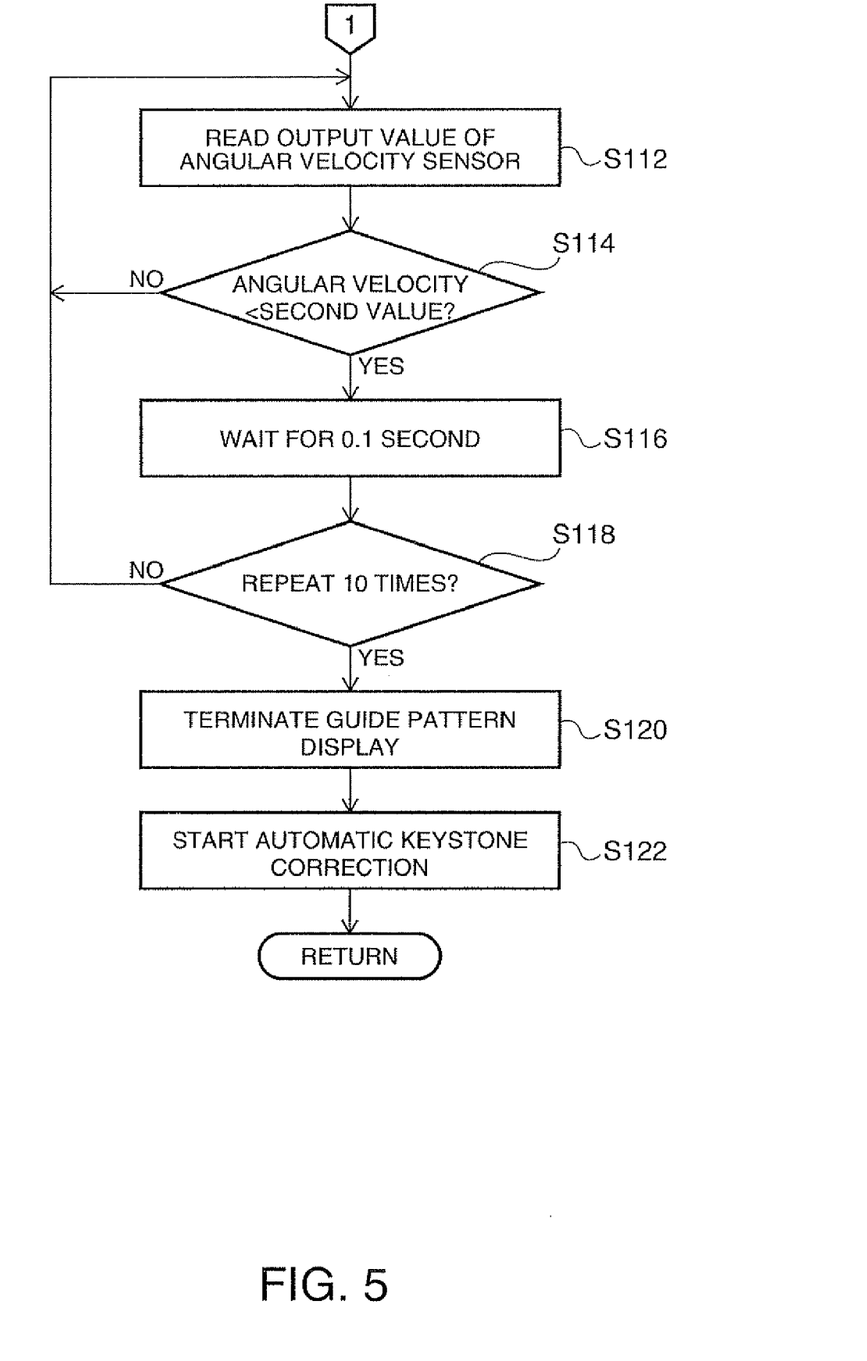
FIG. 5 is a flowchart showing a flow of a cancel process of the keystone correction and a starting process of the keystone correction in the projector 100.

FIGS. 4 and 5 are flowcharts showing a flow of the cancel process of the keystone correction and the starting process of the keystone correction in the projector 100 of the present embodiment. When powering on the projector 100, the keystone correction section 140 executes the keystone correction process on the uncorrected image data, which is written into the memory 130 by the image processing section 120, with the keystone correction amount thus set thereto (step S102). The keystone correction amount in the previous use is set in an internal memory (not shown) of the keystone correction section 140. The keystone correction amount in the previous use is a value (described later) calculated by the keystone correction section 140 in accordance with the tilt of the projector 100 with respect to the screen SC at the last time the projector is used.

Further, the CPU 160 reads the detected value of the angular velocity sensor 190 (step S104). The CPU 160 determines whether or not the angular velocity thus detected is greater than a first value (step S106), and if the angular velocity is lower than the first value (NO in the step S106), the process returns to the step S104. The first value has been set previously. In the step S106, the CPU 160 determines that the movement of the projector 100 starts based on the angular velocity detected by the angular velocity sensor 190. In other words, the fact that the angular velocity is greater than the first value means that the movement of the projector 100 has started.

If the angular velocity detected by the angular velocity sensor 190 is greater than the first value (YES in the step S106), the CPU 160 makes the keystone correction section 140 cancel the keystone correction process (step S108). Specifically, the CPU 160 updates the keystone correction amount stored in the internal memory (not shown) of the keystone correction section 140 to (0, 0). The keystone correction amount is defined by the pitch angle and the yaw angle described above. It should be noted that as the method of canceling the keystone correction process, there can be adopted a method of switching a path of the image data representing the image so that the image data is directly output to the liquid crystal panel drive section 155 without going through the keystone correction section 140.

Subsequently, the CPU 160 controls the keystone correction section 140 to read the guide pattern data GD from the memory 130, and then output the guide pattern data GD to the liquid crystal panel drive section 155. As a result, the guide pattern GP (FIG. 3) is displayed on the screen SC (step S110).

Then, the CPU 160 reads the detected value of the angular velocity sensor 190 again (step S112), and determines whether or not the angular velocity detected by the angular velocity sensor 190 is lower than a second value (step S114). Here, as the second value, a value smaller than the first value has been set previously. If the angular velocity is greater than the second value (NO in the step S114), the process returns to the step S112.

If the angular velocity is lower than the second value (YES in the step S114), the CPU 160 waits for 0.1 second (step S110), and then determines whether or not the process corresponding to the steps S112 through S116 is repeated 10 times (step S118). If the process has not yet been repeated 10 times (NO in the step S118), the process returns to the step S112. In other words, the CPU 160 repeatedly performs the process corresponding to the steps S112 through S116 until the process corresponding to the steps S112 through S116 has been repeated 10 times. In the present embodiment, the fact that the process corresponding to the steps S112 through S116 has been repeated 10 times means that a predetermined time (1 second) has elapsed while keeping the angular velocity at a value lower than the second value.

In the steps S112 through S116, the CPU 160 determines whether or not the movement of the projector 100 has stopped. The fact that the angular velocity is greater than the second value in the step S114 means that the projector 100 is still being moved (moving). The fact that the angular velocity is determined to be lower than the second value 10 consecutive times in the step S114 means that the movement of the projector 100 has stopped.

If the CPU 160 determines that the process corresponding to the steps S112 through S116 has been repeated 10 times (YES in the step S112), the CPU 160 controls the keystone correction section 140 to terminate the display of the guide pattern GP (step S120), and to start the automatic keystone correction process (step S122), and the process returns to the step S102.

Figure 6:
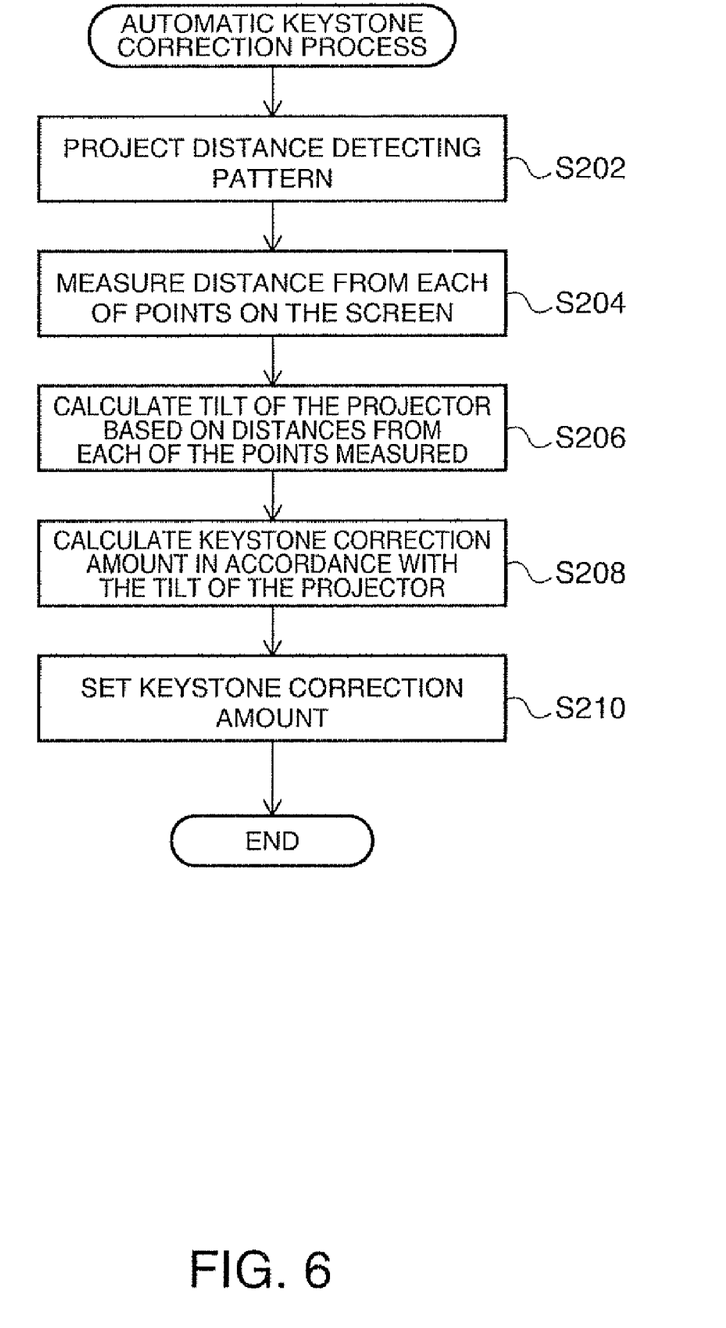
FIG. 6 is a flowchart showing a flow of an automatic keystone correction process executed in the projector 100.

Then, the automatic keystone correction process executed in the projector 100 will briefly be explained with reference to FIG. 6. FIG. 6 is a flowchart showing a flow of the automatic keystone correction process executed in the projector 100. The "automatic keystone correction process" is a process for setting the keystone correction amount executed on the image so that the distortion of the image caused by the tilt of the projector 100 with respect to the screen SC is reduced.

As shown in FIG. 6, when the instruction to start the automatic keystone correction is provided from the CPU 160, the keystone correction section 140 transmits a distance detecting pattern, which is previously stored in the memory 130, to the liquid crystal panel drive section 155, thereby projecting the distance detecting pattern on the screen SC (step S202). In the present embodiment, the distance detecting pattern includes a lattice and lattice points.

During the period in which the distance detecting pattern is displayed (step S202), the keystone correction section 140 measures the distance from each of the points on the screen SC based on the shot image taken by the image shooting section 180 (step S204). In the present embodiment, the distance from each of the points on the screen SC is measured by triangulation.

After the distance from each of the points on the screen has been measured (step S204), the keystone correction section 140 calculates the tilt of the projector 100 with respect to the screen SC based on the distance from each of the points thus measured (step S206). Subsequently, the keystone correction section 140 calculates the keystone correction amount in accordance with the tilt of the projector 100 (step S208), and overwrites the keystone correction amount thus calculated on the internal memory (not shown) of the keystone correction section 140, thereby setting the keystone correction amount (step S210). In the projector 100, when the automatic keystone correction process is terminated, the image input to the projector 100 is displayed instead of the distance detecting pattern. Since the automatic keystone correction process is executed, the image corrected in the keystone distortion is displayed on the screen SC.

It should be noted that the keystone correction section 140 can also be arranged to have a configuration of correcting the variation in luminance due to the relative position between the projector 100 and the screen SC, or executing an anti-aliasing process when generating the corrected image data. Further, in the projector 100, the CPU 160 can also be arranged to have a configuration of controlling the lens drive section 158 to perform adjustment of the focus and adjustment of the zoom state in addition to controlling the keystone correction section 140 to start the automatic keystone correction process.

In the present embodiment, the keystone correction amount is recorded on the internal memory (not shown) of the keystone correction section 140. Therefore, the keystone correction section 140 executes the keystone correction process based on the keystone correction amount recorded on the internal memory of the keystone correction section 140 (step S102) until start of movement of the projector 100 and stop of the movement thereof are detected subsequently. If the movement of the projector 100 and the stop of the movement thereof are subsequently detected (YES in the step S106), the keystone correction amount recorded on the internal memory of the keystone correction section 140 is cancelled (i.e., the keystone correction amount is set to be (0, 0)) (step S108). If the stop of the movement of the projector 100 is detected (steps S112 through S118), the keystone correction amount thus recalculated is recorded on the internal memory of the keystone correction section 140 (step S122).

A-3. Advantage of Embodiment

Figure 7A:
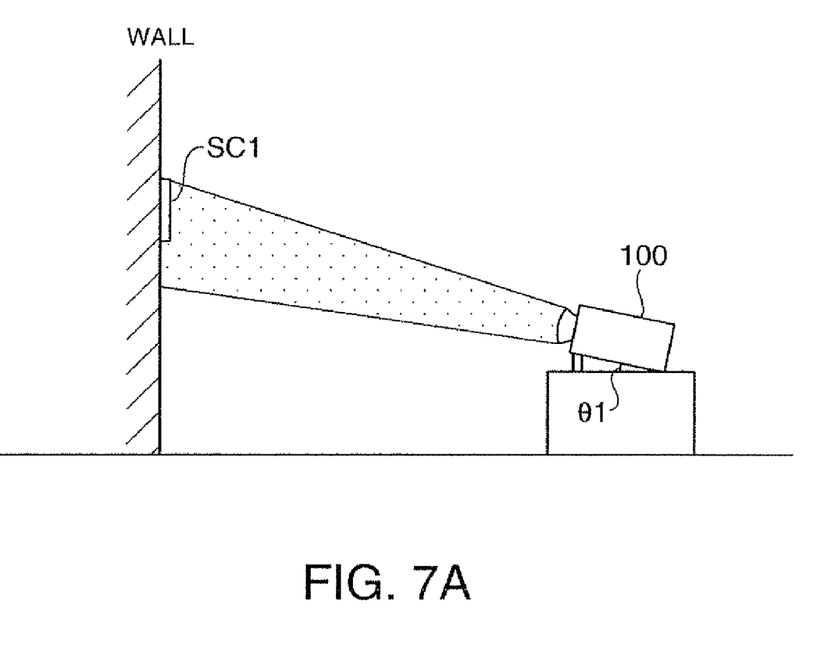
FIGS. 7A and 7B are explanatory diagrams showing how the user moves the projector thereby changing the position where the image is displayed.
Figure 7B:
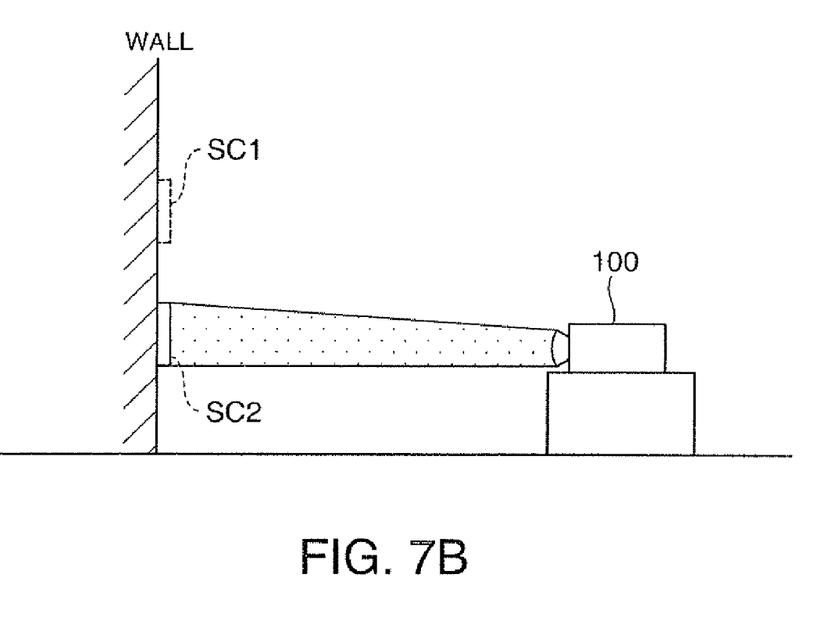

The advantages of the present embodiment will be explained with reference to FIGS. 7A, 7B, 8A1 through 8A4, and 8B1 through 8B4. FIGS. 7A and 7B are explanatory diagrams showing how the user moves the projector thereby changing the position where the image is displayed. FIG. 7A shows the state in which the projector 100 is installed so as to be tilted an angle $\theta 1$ upward from the horizontal, and FIG. 7B shows the state in which the projector 100 is installed horizontally. In the present embodiment, it is assumed that a screen on which the image is projected is installed on the wall in order for clearly showing the position on which the user desires to display the image (FIGS. 7A and 7B). In FIG. 7B, the position of the screen SC2 is moved on the lower side of the position of the screen SC1 in FIG. 7A. In FIG. 7B, the position of the screen SC1 is illustrated with a broken line. It should be noted that the positions of the screens SC1, SC2 are assumed not to be moved in the lateral direction. FIGS. 7A and 7B show the case in which the user moves the projector 100 from the position shown in FIG. 7A to the position shown in FIG. 7B in order for change the projection position of the image from the screen SC1 to the screen SC2.

Figure 8A:
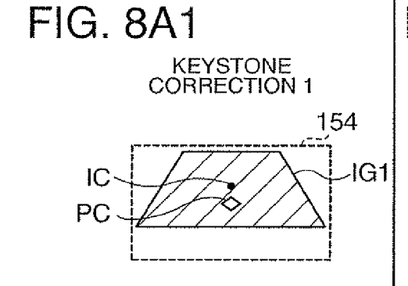

FIGS. 8A1 through 8A4, and 8B1 through 8B4 are explanatory diagrams conceptually showing the displayed image in the case in which the position of the projector 100 is moved as shown in FIGS. 7A and 7B, in the projector 100 according to the present embodiment. Similarly to FIGS. 10A1 through 10A4, and 10B1 through 10B4 explained above, FIGS. 8A1 through 8A4, and 8B1 through 8B4 show the liquid crystal panel 154 (FIGS. 8A1 through 8A4) and the image display area (FIGS. 8B1 through 8B4). Similarly to FIGS. 10A1 through 10A4, in FIGS. 8A1 through 8A4, the image light generation area IG for generating the image light representing the image in the entire area of the liquid crystal panel is indicated by hatching with oblique lines. It should be noted that the image light generation area after executing the keystone correction process at the projector position shown in FIG. 7A is denoted as IG1, the image light generation area after canceling the keystone correction is denoted as IG2, and the image light generation area after executing the keystone correction process at the projector position shown in FIG. 7B is denoted as IG3. FIGS. 8A2 and 8A3 show the state in which the image light representing the guide pattern GP is formed in the liquid crystal panel 154.

Similarly to FIGS. 10B1 through 10B4, in FIGS. 8B1 through 8B4, the panel display area PA as the entire area of the liquid crystal panel 154 is illustrated with a broken line. Further, the image display area PIG where the image represented by the image light modulated by the liquid crystal panel 154 is indicated by hatching with oblique lines. The outline of the screen SC is illustrated with a thick line. It should be noted that the image display area after executing the keystone correction process at the projector position shown in FIG. 7A is denoted as PIG1, and the image display area after executing the keystone correction process at the projector position shown in FIG. 7B is denoted as PIG3.

Figure 8A:
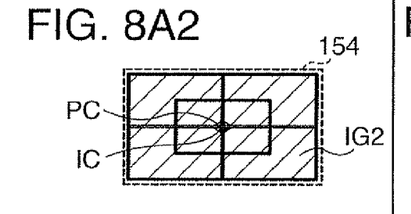
Figure 8A:
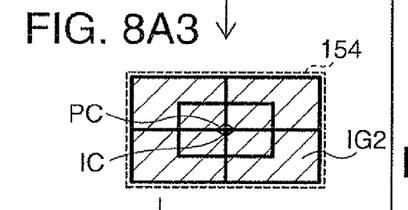
Figure 8A:
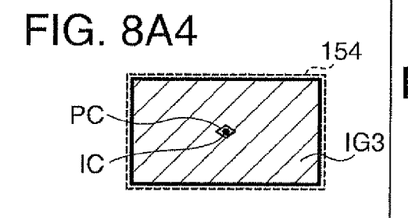
Figure 8B:
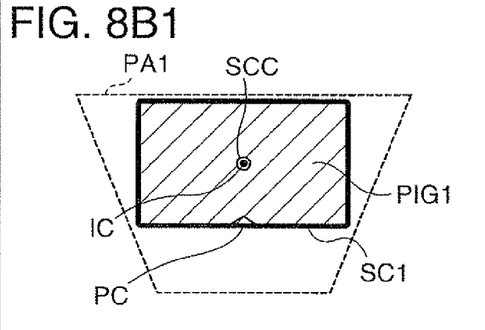

FIGS. 8A1 and 8B1 show the case in which the keystone correction is executed at the projector position shown in FIG. 7A. As shown in FIG. 7A, since the projector 100 is tilted $\theta 1$ upward from the horizontal, the panel display area PA1 is distorted to have a trapezoidal shape. Since the image light generation area IG1 of the liquid crystal panel 154 is distorted to have a trapezoidal shape in the counter direction with respect to the panel display area PA1 (FIG. 8A1), the image display area PIG1 is corrected to have a rectangular shape, and is fitted in the frame of the screen SC1 (FIG. 8B1). On this occasion, the center SCC (white circle) of the screen SC1 and the center IC (black circle) of the image display area PIG1 are identical to each other.

Figure 8B:
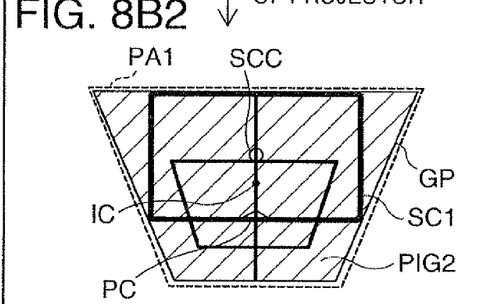
Figure 8B:
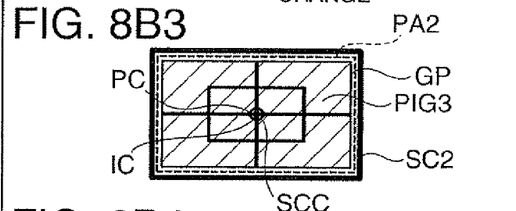
Figure 8B:
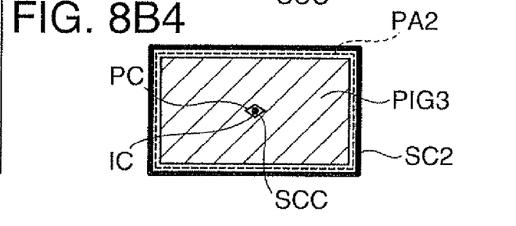

When the user starts movement of the projector 100, the keystone correction is canceled in the projector 100, and the image light representing the guide pattern GP is formed in the liquid crystal panel 154 (FIG. 8A2). On this occasion, assuming that the projector 100 is still located in the vicinity of the position shown in FIG. 7A, the guide pattern is displayed on the wall surface in the state of being distorted to have a trapezoidal shape (FIG. 8B2). On this occasion, the center SCC (white circle) of the screen SC1, the center IC (black circle) of the image display area PIG2, and the center PC (rhombic symbol) of the panel display area PA1 are not identical to each other. The center of the panel display area PA1 is identical to the center (i.e., the intersection between l1 and l2) of the guide pattern GP.

As described above, in the condition of displaying the guide pattern GP on the wall surface, the user moves the projector 100. When the user moves the projector 100 so that the center (i.e., the intersection between l1 and l2) of the guide pattern GP becomes identical to the center SCC (white circle) of the screen SC2, the projector 100 is installed horizontally as shown in FIG. 7B. When the user does not move the projector 100 after installing the projector 100 at the position shown in FIG. 7B, the projector 100 starts the automatic keystone correction (also referred to as keystone correction 2). Since the projector 100 is installed horizontally, the keystone correction amount becomes (0, 0), and in the liquid crystal panel 154, the image light generation area IG with a rectangular shape is formed so as to fill the entire area of the liquid crystal panel 154 (FIG. 8A4). Therefore, the image display area PIG3 becomes rectangular, and is fitted in the frame of the screen SC2.

As explained above, according to the projector 100 of the present embodiment, when start of movement of the projector 100 is detected, the keystone correction process is canceled, and the guide pattern is displayed. Therefore, when the user moves the projector 100 so that the center of the guide pattern becomes identical to the center of the screen SC2, the image is displayed in the middle of the screen SC2. In other words, it is possible to display the image at the position where the user intends to display the image. It should be noted that the center of the image display area and the center of the screen might not be identical to each other depending on the relative position between the screen and the projector 100 after the movement of the projector 100. However, even in such a case, it becomes possible to reduce the shift between the center of the image display area PIG when executing the keystone correction after the movement of the projector and the center of the screen compared to the case in which the position of the projector is moved while not canceling the keystone correction process. In other words, in the case in which the keystone correction is executed after changing the display position of the image displayed by the projector 100, it is possible to reduce the shift between the display position of the image supposed by the user and the actual display position of the image.

Further, when the movement of the projector is stopped, the automatic keystone correction is started. Therefore, since the distortion in the image projected of the screen SC is corrected and the focus is adjusted without requiring any operation by the user, convenience to the user can be enhanced.

B. MODIFIED EXAMPLES

It should be noted that the invention is not limited to the embodiment described above, but can be put into practice in various forms within the scope of the invention.

1. In the embodiment described above, although the angular velocity sensor 190 is used in order for detecting movement of the projector 100 and stop thereof, the invention is not limited to use of the angular velocity sensor 190, but can use anything capable of detecting movement of the projector and stop thereof. For example, a G sensor, an acceleration sensor, or an optical sensor can be used instead of the angular velocity sensor 190. Further, it is also possible to detect movement of the projector 100 and stop thereof based on the shot image taken by the image shooting section 180.

2. Although in the embodiment described above the pattern for detecting the distance is projected on the screen SC, and the keystone correction amount is calculated based on the shot image taken by the image shooting section 180, the method of calculating the keystone correction amount is not limited to the embodiment described above. For example, in the case of automatically executing only the vertical keystone correction, it is also possible to adopt the configuration of obtaining the tilt of the projector 100 with respect to the screen SC using a G sensor, and then calculating the keystone correction amount. Further, it is also possible to adopt the configuration of obtaining the tilt of the projector 100 with respect to the screen SC using a line sensor (an optical sensor).

3. Although in the embodiment described above, there is exemplified the configuration in which when start of movement of the projector 100 is detected, the keystone correction process is canceled, and the guide pattern GP is displayed instead of the image (the image represented by the uncorrected image data stored in the memory 130) displayed at that moment, it is sufficient that at least the keystone correction process is canceled. For example, it is also possible to adopt the configuration in which after the keystone correction process is canceled, the image (the image represented by the uncorrected image data stored in the memory 130) displayed at that moment is continuously displayed. It should be noted that there can be adopted the configuration in which the comment (e.g., "keystone correction process has been canceled") telling that the keystone correction process has been canceled is displayed on this occasion. According to this configuration, it is possible to reduce the possibility that the user gets upset about a failure and so on even when the shape of the image area of the displayed image is changed.

Further, it is also possible to adopt the configuration of generating a composite guide pattern data obtained by combining the image data supplied from the resolution conversion section 124 and the guide pattern data stored in the memory 130 in the image combining section 126. According to this configuration, the image in the state of overlapping the guide pattern on the image to be input is displayed on the screen SC. According also to this configuration, substantially the same advantages as in the embodiment can be obtained.

4. Although in the embodiment described above, there is exemplified the configuration in which the automatic keystone correction process is started when stop of movement of the projector 100 is detected, it is not necessarily required to adopt the configuration of automatically starting the automatic keystone correction process. In other words, it is also possible to adopt the configuration of only canceling the automatic keystone correction process in response to detection of start of movement of the projector 100. It is also possible for the user to perform alignment of the projector in the state (the state in which the projected image is distorted) in which the automatic keystone correction process is canceled, and then operate the operation button 170 to execute the automatic keystone correction process. According also to this configuration, the shift between the display position of the image after executing the automatic keystone correction process and the display position of the image supposed by the user can be reduced, thus the convenience to the user is enhanced.

5. Although in the embodiment described above, the projector 100 modulates the light from the illumination optical system 152 using the transmissive liquid crystal panel 154, the invention is not limited to use of the transmissive liquid crystal panel 154, but the configuration of modulating the light from the illumination optical system 152 using, for example, a digital micro-mirror device (DMD (registered trademark) or a reflective liquid crystal panel (liquid crystal on silicon (LCOS (registered trademark))) can also be adopted.

Hereinabove, the embodiment of the invention and the various modified examples thereof are described. It is obvious that the invention is not limited to the embodiment and the modified examples, but can adopt various configurations within the scope of the invention.

For example, the functions realized by the hardware can be realized in a software manner by the CPU executing predetermined programs.

What is claimed is:

1. A projector adapted to perform display by projecting an image on a projection surface, comprising:
   a light source;
   a light modulator adapted to modulate light from the light source into image light representing the image;
   a projection optical system adapted to project the image light modulated by the light modulator on the projection surface;
   a keystone distortion correction section adapted to perform a keystone distortion correction process for correcting keystone distortion of the image to be projected on the projection surface;
   a detection section adapted to detect start of movement of the projector;
   a storage section adapted to store guide pattern data representing a guide pattern indicating a center of a maximum area capable of modulating the light from the light source in the light modulator; and
   a control section adapted to cancel the keystone distortion correction process in the keystone distortion correction section and make the light modulator modulate the image light representing the guide pattern based on the guide pattern data stored in the storage section in response to detection of the start of movement of the projector in the detection section.

2. The projector according to claim 1, wherein
   the detection section is provided with an angular velocity sensor adapted to detect an angular velocity of the projector, and detects the movement of the projector in response to the angular velocity detected by the angular velocity sensor exceeding a first value previously determined.

3. The projector according to claim 1, wherein
   the detection section detects stop of movement of the projector, and
   the control section, in response to detection of the stop of movement of the projector in the detection section, makes the keystone distortion correction section restart the keystone distortion correction process.

4. The projector according to claim 3, wherein
   the detection section is provided with an angular velocity sensor adapted to detect an angular velocity of the projector, and detects stop of movement of the projector in the case in which the angular velocity detected by the angular velocity sensor exceeds a first value previously determined, then becomes lower than a second value lower than the first value, and a predetermined time has elapsed while the angular velocity is kept lower than the second value.

5. A method of controlling a projector adapted to perform display by projecting an image on a projection surface, the method comprising:
   (a) performing a keystone distortion correction process for correcting keystone distortion of the image to be projected on the projection surface;
   (b) detecting start of movement of the projector;
   (c) canceling the keystone distortion correction process in response to detection of start of movement of the projector; and
   (d) projecting a guide pattern indicating a center of a maximum area capable of modulating light from a light source while the keystone distortion correction process is canceled.

6. The method of controlling projector according to claim 5, further comprising:
   (e) detecting stop of movement of the projector; and
   (f) restarting the keystone distortion correction process in response to detection of the stop of movement of the projector.

* * * * *